April 8, 1947.                C. S. McCHESNEY                2,418,783
                      TIRE ELEMENT SUPPLY MECHANISM
               Original Filed Oct. 3, 1942      5 Sheets-Sheet 1

INVENTOR
CUYLER S. McCHESNEY
BY Benj. T. Rauber
his ATTORNEY

April 8, 1947. C. S. McCHESNEY 2,418,783
TIRE ELEMENT SUPPLY MECHANISM
Original Filed Oct. 3, 1942 5 Sheets-Sheet 2

INVENTOR
CUYLER S. McCHESNEY.
BY Benj. T. Rauber
his ATTORNEY

April 8, 1947.  C. S. McCHESNEY  2,418,783
TIRE ELEMENT SUPPLY MECHANISM
Original Filed Oct. 3, 1942   5 Sheets-Sheet 4

INVENTOR.
CUYLER S. McCHESNEY,
BY Benj. T. Rauber
his ATTORNEY.

April 8, 1947. C. S. McCHESNEY 2,418,783
TIRE ELEMENT SUPPLY MECHANISM
Original Filed Oct. 3, 1942 5 Sheets-Sheet 5
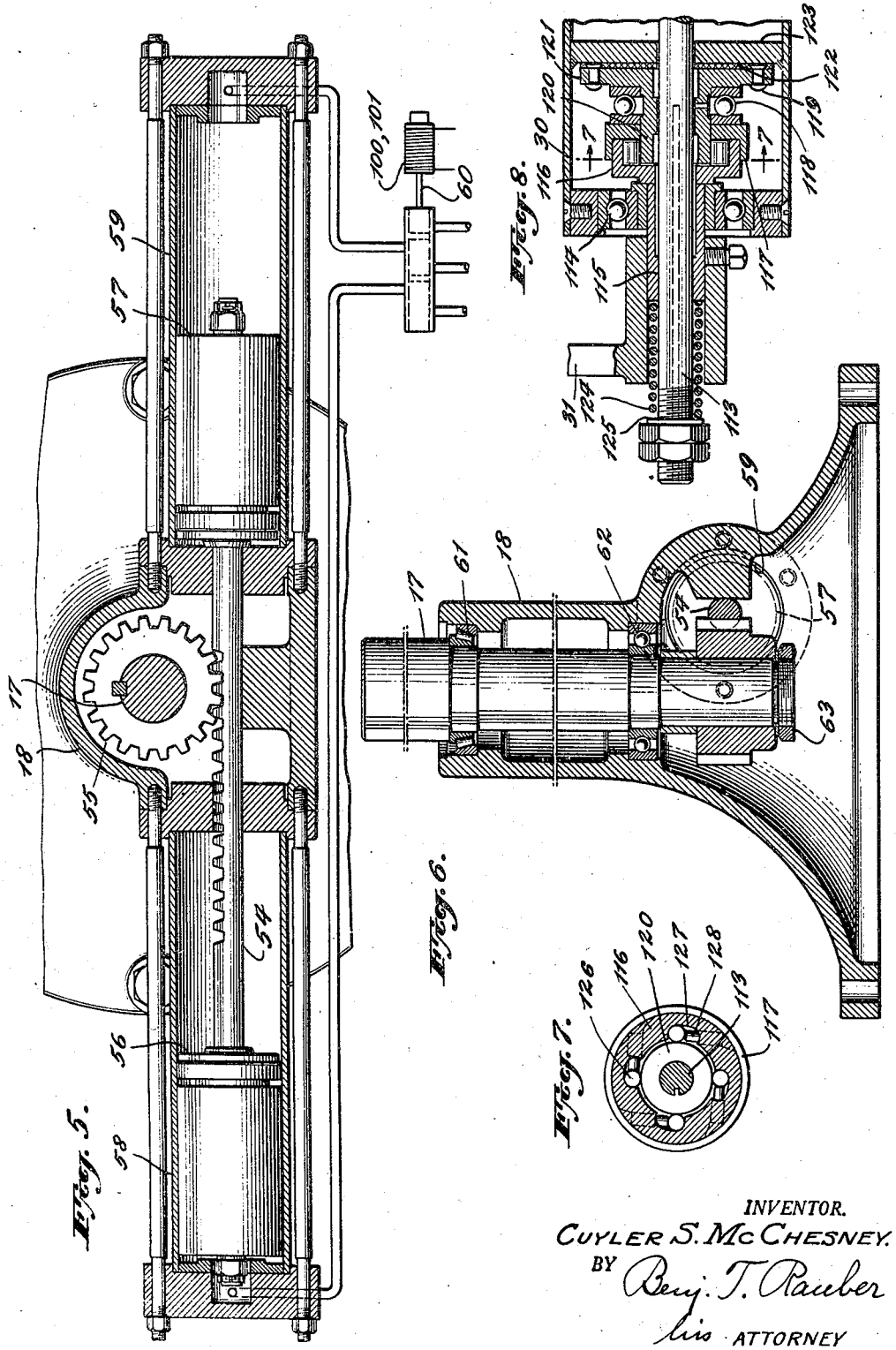
INVENTOR.
CUYLER S. McCHESNEY.
BY Benj. T. Rauber
his ATTORNEY Patented Apr. 8, 1947

2,418,783

UNITED STATES PATENT OFFICE 2,418,783

TIRE ELEMENTS SUPPLY MECHANISM

Cuyler S. McChesney, Kenmore, N. Y., assignor to Dunlop Tire and Rubber Corporation, Buffalo, N. Y., a corporation of New York Original application October 3, 1942, Serial No. 460,705. Divided and this application November 18, 1944, Serial No. 564,160

6 Claims. (Cl. 154—10)

My present invention relates to a mechanism for supplying tire elements, namely the rubberized cord fabric, breaker and chafer strips and tread to a tire forming drum on which they are built into a tire carcass later to be shaped, molded and vulcanised.

This application is a division of my co-pending application Ser. No. 460,705, filed October 3, 1942, for Tire building machine, now matured into Patent No. 2,394,464, dated February 5, 1946.

In the tire building machine of my application Ser. No. 460,705, a forming drum is rotated by a motor under the control of a timing mechanism to wrap the bias cut cord fabric first in one direction and then in another, certain of the fabrics being wrapped about tire beads and then wrapping on the assembly the chafer strip, breaker strip and finally the tread.

My present invention relates to a mechanism for bringing the cord fabric, chafer strip, breaker strip and tread to position to be wrapped onto the drum in timed sequence, but it is also applicable to other tire forming mechanism in which these various elements are to be wrapped and assembled onto a forming drum.

The various features of the invention are illustrated, by way of example, in the accompanying drawings in which Fig. 1 is a side elevation of a supply mechanism embodying a preferred form of the invention and showing its relation to the tire forming drum;

Fig. 5 is a detail of a fluid operated mechanism for rotating a turret of the drum;

Fig. 6 is a vertical section of the lower part of the turret;

Fig. 7 is a cross-section of a detail of a fabric winding drum; taken on line 7—7 of Fig. 8;

Fig. 8 is a longitudinal section of an end of a fabric supply roll;

Fig. 9 is a wiring diagram showing an arrangement of the electric circuits for controlling the various elements of my invention.

Figure 1:
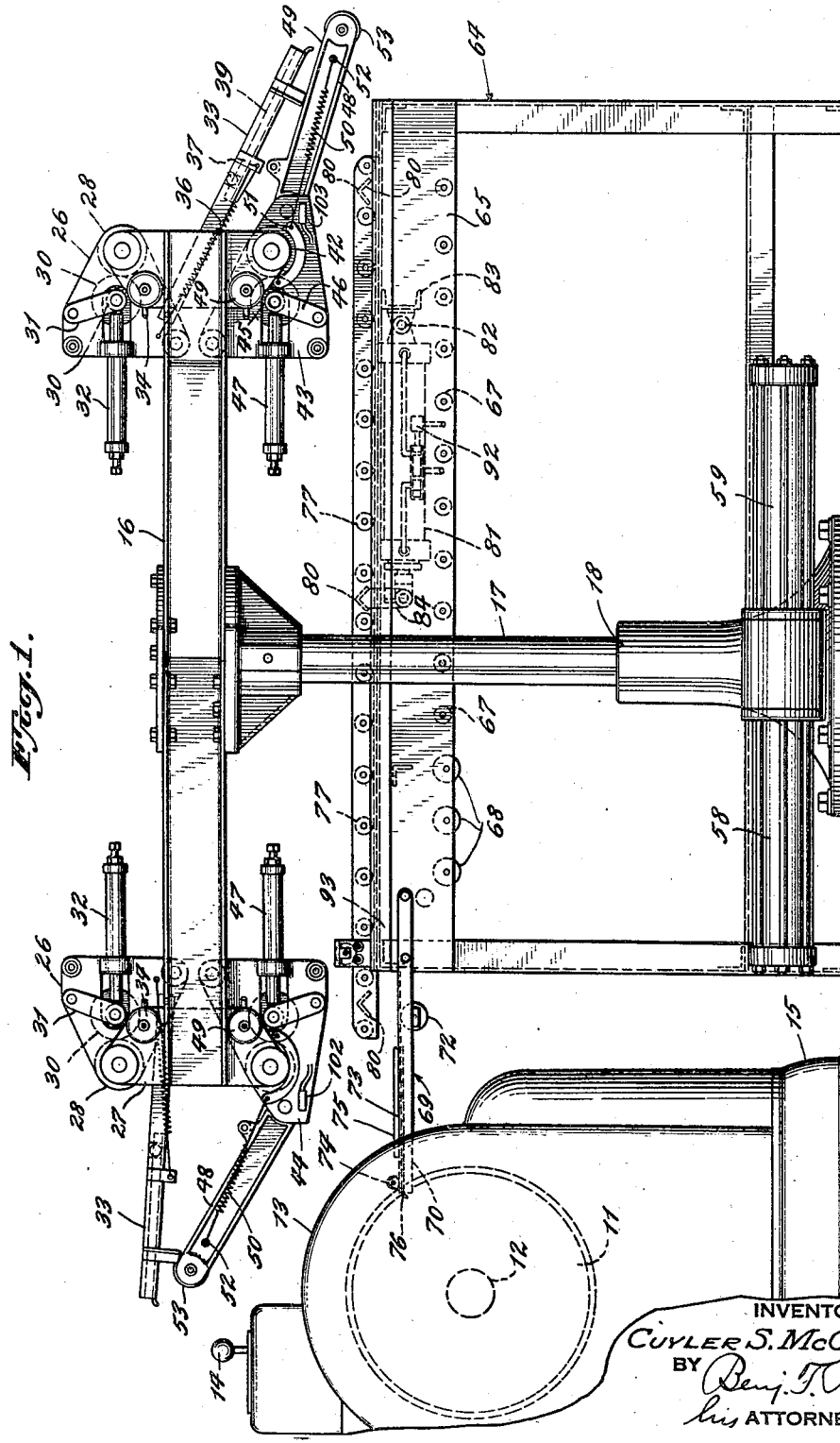

In my present invention a pair of tire supply means are mounted symmetrically on arms of a framework carried on the upper end of a vertical rotatable turret.

In the operation of the apparatus one of these supply mechanisms is in a position to deliver tire fabric to the forming drum while the other is in an opposite position, preferably diametrically opposite, to receive or be loaded with tire fabric.

The tire supply means comprises rolls on which the tire fabric is stored and from which it may be drawn onto the forming drum.

The invention is illustrated as applicable to supply mechanism for forming a 4-ply tire. The first two plies are offset sidewise and, therefore, the supply rolls may be shifted. The third and fourth plies are generally of narrower width and are carried on a separate roll, there being thus two sets of rolls for each supply unit.

The turret is preferably offset from the median plane of the drum to provide room for tread, breaker and chafer strips supplied, which are carried on conveyer rollers and a feeding mechanism to advance them to the forming drum.

In the embodiment illustrated in the accompanying drawings a forming drum 11 is mounted on a rotating shaft 12 supported in and extending sidewise from a housing 13 which contains a driving motor and which is also provided with a timing mechanism 14.

The housing 13 is mounted on a base which has an extension 15 extending below the forming drum 11. The supply mechanism is mounted at one side of the forming drum so that the several plies may be drawn or supplied directly to the circumferential surface of the drum.

As shown more particularly in Figs. 1 to 4, the plies are carried on a horizontal table or turret 16 carried on the upper end of a vertical shaft or pillar 17 rotatably supported on a base 18. The table 16 comprises two triangular frames 19 and 20 mounted on the top of the pillar 17 in symmetrical position and each comprising shorter straight beams 21 and 22 and, at an angle, longer beams 23 and 24, each having an extension 25 parallel to its beam 21 or 22.

Between the beams 21 and 22 and the parallel extensions 25 of the beams 23 and 24 there are mounted two sets of bias fabric supply mechanisms. The upper set comprises a pair of side plates 26 and 27 slidably secured between the extensions 25 of the beams 21 and 23 respectively, and between these side plates is mounted a supply roll 28 having wrapped thereon the bias cut fabric 29 and a liner of fabric to which the rubberized bias cut fabric will not adhere.

Figure 4:
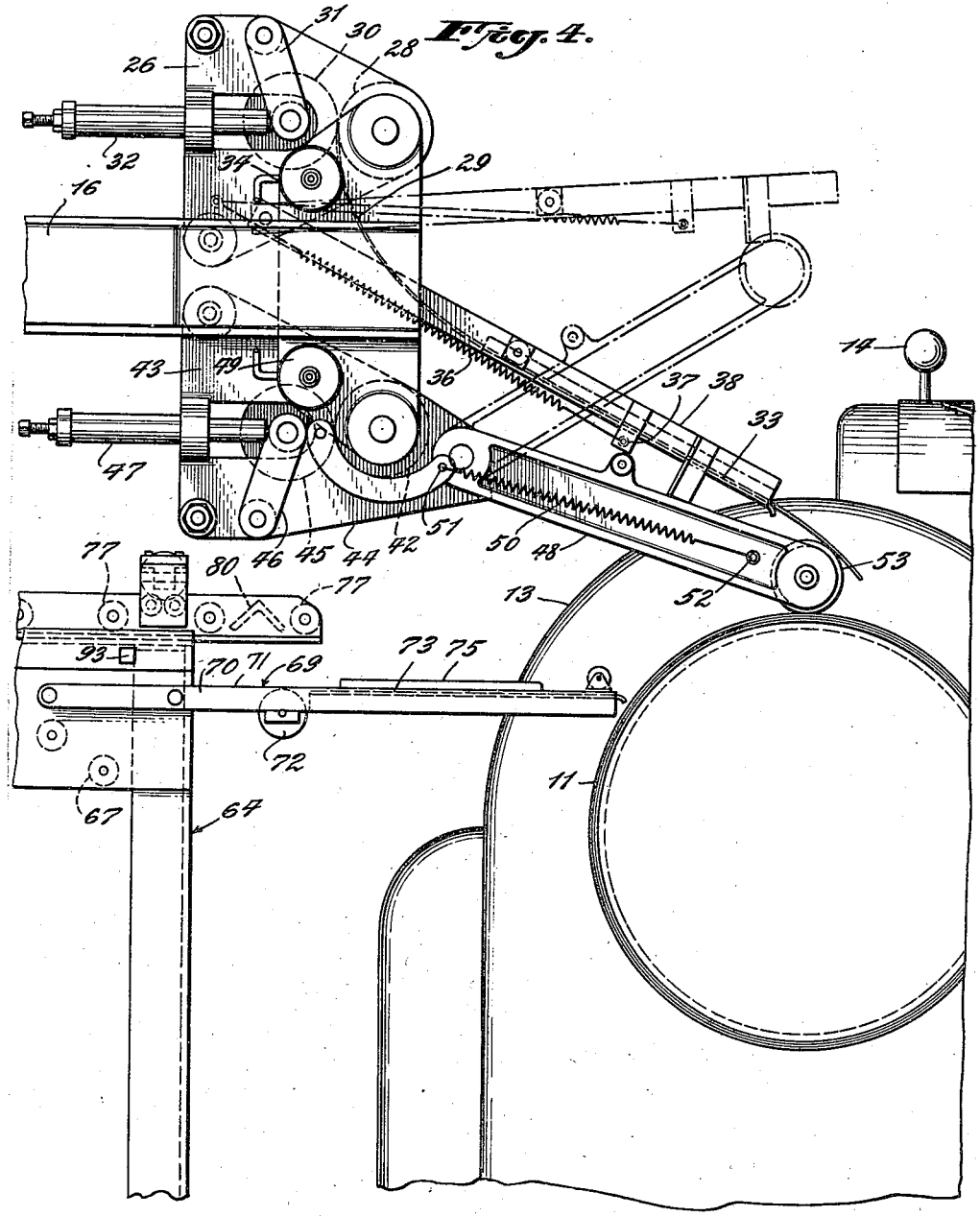
Fig. 4 is a side elevation on a somewhat larger scale of the delivery end of the supply mechanism and of the forming drum.

As the bias fabric is drawn from the supply roll 28 the liner will pass from the roll 28 and be wrapped onto a roll 30 supported on swing arms 31 and pressed against the roll 28 by a spring mechanism 32, Fig. 4.

As the roller 30 is rotated the liner is wrapped about it while the bias cut fabric 29 passes down onto a feeding table 33 which is pivotally supported at its upper end between the plates 26 and 27 so that it may be swung from the operative position, shown at the right of Fig. 1, upwardly to the inoperative position, shown at the left thereof and shown in broken lines in Fig. 4.

The plates 26 and 27 and the rolls and feeding table may be shifted sidewise as a unit by means of pneumatic pistons and cylinders 34 secured to the beams 21 or 22 and extensions 25 by brackets and thus serve to shift the bias fabric supplied to the drum. Admission of air to and from the cylinder is controlled by an electromagnetic valve 35.

Tension springs 36 tensioned between pins 37 on opposite sides of the table 33 and pins on the supports 26 and 27 serve to hold the table in its upper or lower position by passing over a neutral or dead center in swinging from one position to the other.

Figure 2:
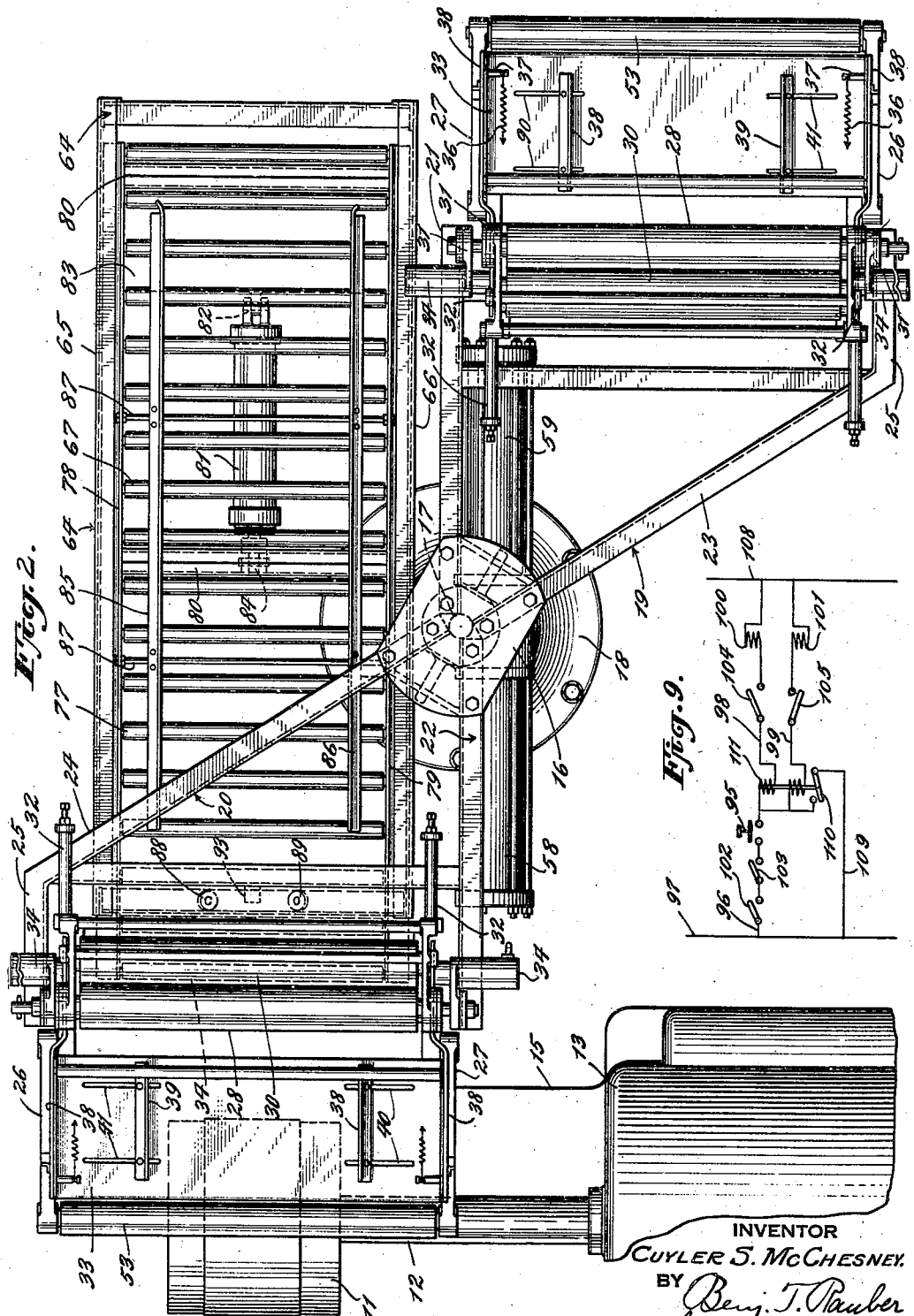
Fig. 2 is a plan view of the mechanism shown in Fig. 1.

On each table 33 there are mounted a pair of spaced guides 38 and 39 which may be positioned to guide the bias cut fabric into proper position for application to the forming drum 11, as shown at the left of Fig. 2. Transverse slots 40 and 41 are provided in the table through which securing studs of the guides pass to permit sidewise adjustment according to the width of the ply.

When a ply as, for example, the first and second plies, are to be applied to the forming drum 11, the table 33 is lowered to the position shown at the right in Fig. 1, while it is at the left and immediately above the forming drum 11, and the fabric as it is wrapped on the forming drum is drawn over the table and between the guides 38 and 39.

When the drum has completed one full revolution the bias cut fabric is torn loose leaving two cords to overlap and thereupon to be spliced by the stitching rollers. The unused part is then turned back onto the table 33.

The third and fourth plies are supplied from a lower feed supply similar to that of the upper, having a supply roll 42 supported between two side plates 43 and 44 slidably mounted between the beams 21 or 22 and 23 or 24. A roller 45 swings on arms 46 and is pressed by a spring mechanism 47 against the roll 42. The supply being drawn from the supply roll 42 passes between the rolls 42 and 45 and the liner is rolled on the roll 45 while the ply fabric passes to a table 48 pivoted at its upper end between the supports 43 and 44. The plates 43 and 44, rolls 42 and 45 and table 48 are shifted by means of pneumatic pistons and cylinders 49, similar to the pistons and cylinders 34, and secured to the beams 21, 22, 23 and 24 respectively.

The lower table is also held in upper or lower position, shown at the left and right of Fig. 1, by means of springs 50 confined between the pins 51 on the support and pins 52 on the table to pass over a dead center in moving from upper to lower position, or vice versa. The lower table 48 is also provided with guides, not shown, similar to those of the upper table 33. At the lower end of the table there is mounted a rotatable roll 53 about which the bias cut fabric may pass to the drum 11 from either table, when the drum is rotated in reverse, so that as the forming drum is rotated one revolution in reverse the bias cut fabric is applied with the cords inclined oppositely from those of the plies applied in forward rotation.

It will be understood that the feed tables and supply rolls are shifted sidewise in one direction or the other after each ply is drawn therefrom. Inasmuch as the supply mechanisms on opposite sides of the table are identical only one of them is described and the same reference numerals are applied to each.

The rolls 28 and 42 contain enough ply fabric for a definite number of tires, for example, six tires. When the supply rolls are exhausted the turret is rotated 180° to bring a new supply of rolls into position to be applied to the drum 11 and the exhausted rolls into position to be replenished. For this purpose the rotatable pillar 17 is rotated 180° about its axis by means of a rack 54 and a pinion 55 keyed on the shaft or pillar 17, Figs. 5 and 6. The rack 54 is connected at its opposite ends to and reciprocated by a pair of fluid actuated pistons 56 and 57 in respective cylinders 58 and 59. Fluid under pressure is alternately admitted to and exhausted from the opposite ends of the cylinders 58 and 59 through an electromagnetically controlled valve 60, shown diagrammatically in Figs. 5 and 6. With each alternate shifting of the pistons 56 and 57 and rack 54, the pinion 55 and shaft 17, to which it is keyed, are rotated alternately 180° in opposite directions.

The shaft or pillar 17 may be mounted on the base 18 by means of an upper frictionless thrust bearing 61 and a lower friction or ball-bearing 62 and is retained in position by means of a retaining ring 63 at its lower end. This enables the pillar to be freely rotated in opposite directions.

The chafer strips, breaker strip and tread are supplied to the drum from a stationary table 64, Figs. 1–4, extending at right angles to the axis of the forming drum and approximately aligned with the center circumferential line of the drum and, therefore, at one side of the pillar or post 17.

The table 64 comprises a pair of parallel spaced horizontal lower rails 65 and 66 in which are journalled a series of parallel spaced rolls 67 on which the breaker and chafer strips are placed to extend longitudinally toward the drum 11, the breaker strip extending along the center line of the row of rollers and there being a chafer strip on each side and extending to the drum in position to be wrapped onto the marginal edges of the assembled tire carcass immediately over the bead.

At the end of the table nearest the drum are three rollers 68 of larger diameter. The breaker and chafer strips extend over these rollers and thence onto a sliding table 69 spaced somewhat above the rollers. The table 69 comprises a pair of side arms 70 and 71 between which is journalled a lead-in roller 72 and then a flat pan 73 which extends to within a short distance of the surface of the drum 11.

At the forward end of the table 69 there is mounted a small roller 74 slightly above the level of the pan 73 underneath which the front ends of the breaker and chafer strips pass. The pan 73 is provided with three parallel sets or pairs of guides 75 for the tread and the chafer strips.

The lead-in rollers 68 are preferably made in a number of sections so that the breaker and chafer strips may move at independent speeds onto and over the pan.

The front end of the pan or table is turned down as at 76 to permit the breaker and chafer strips to pass readily to the drum. In applying the breaker and chafer strips the drum is rotated forwardly one revolution drawing the breaker and chafer strips into the proper position. Afterwards they may be stitched onto the plies and thereafter the tread is applied.

The tread is carried on a series of rollers 77 spaced above the breaker and chafer strips carrying rollers 67 and mounted on a pair of rails 78 and 79 which are slidable lengthwise of the table. The side rails 78 and 79 are connected together by cross beams 80, three being shown by way of example in the accompanying drawings.

While the cord plies, breaker and chafer strips are being applied the assembly of side rails 78 and 79 and rollers 77 on which the tread rests is in the position shown in Fig. 1. When the tread is to be applied to the forming drum 11 the side rails and rolls are moved lengthwise to a position at which the lead-in roller is in position immediately adjacent the assembled tire carcass on the drum.

As shown in Fig. 1 this forward movement is accomplished by means of a fluid operated cylinder 81 pivotally connected at 82 to a cross beam 83 of the table, and a piston having a stem connected at its forward or free end to a depending bracket 84 on the middle cross arm 80.

When fluid under pressure is admitted to the right-hand end of the cylinder 81 it serves to slide the series of rollers 77 toward the drum leaving the advanced end of the tread in position to be applied to the upper surface of the plies, breaker and chafer strips.

The tread is guided on the rollers 77 between a pair of spaced guides 85 and 86 which are adjustably secured to cross bars 87 to permit these guides to be adjusted to the width of the tread. At the front or advancing end of the table 64 a pair of guide disks 88 and 89 are mounted on brackets 90 and 91 or rods extending through uprights in the table so that the spacing or distance apart of these disks may be adjusted to the dimensions of the tread.

When the tread has been applied and spliced rollers 77 are then retracted by admitting fluid pressure to the opposite end of the cylinder 81. The admission of fluid to the cylinder 81 is controlled by an electromagnetic valve 92, Fig. 1.

It will be understood that the drum 11 is driven by its motor at a relatively low speed when the several plies, breaker and chafer strips and the tread are being applied or wrapped on the drum, but may be driven at high speed between these periods of application for the purpose of stitching the plies and tread.

Figure 3:
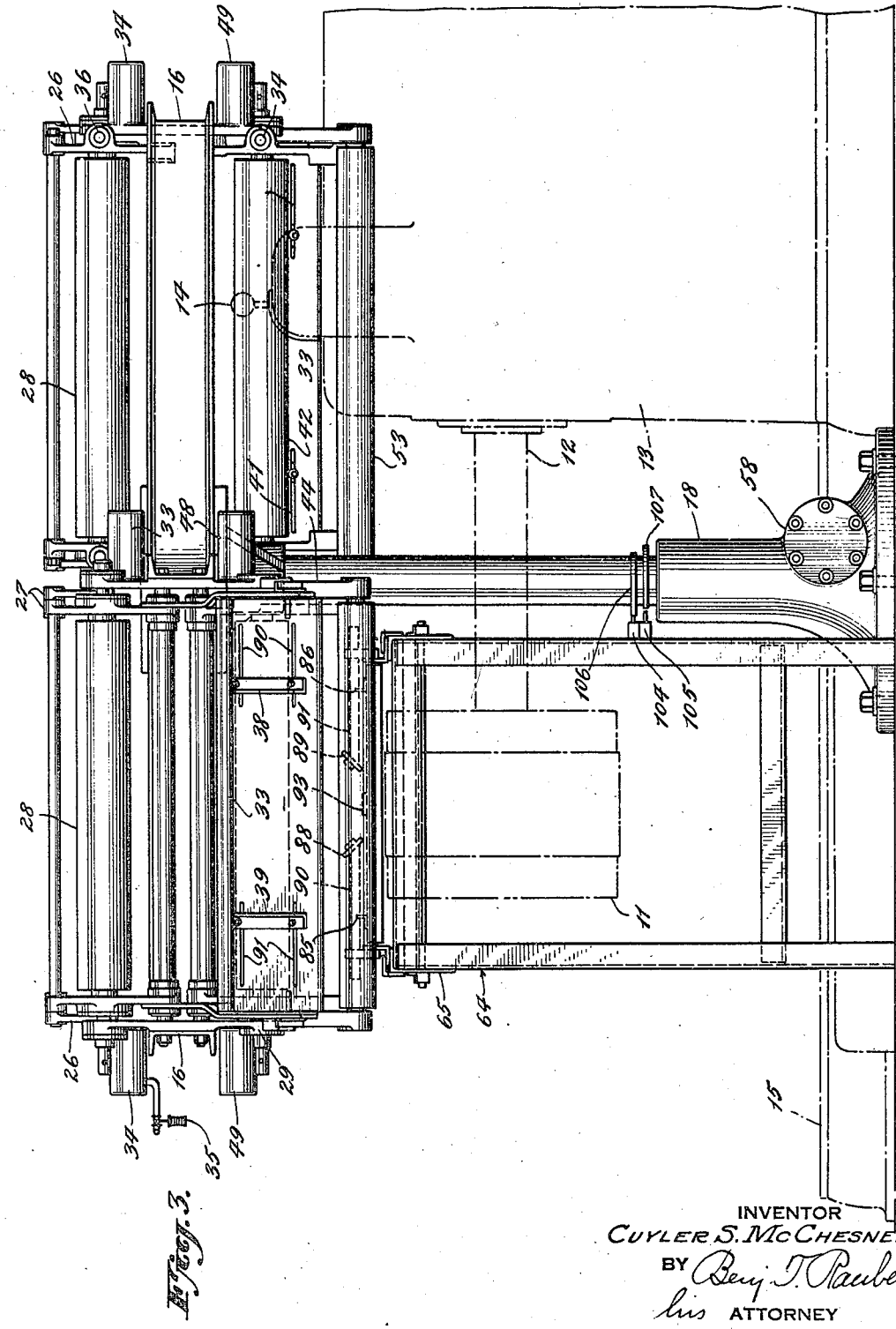
Fig. 3 is a front elevation of the mechanism shown in Figs. 1 and 2.

To prevent the motor from running at high speed until the tread is entirely removed from the tread pan a safety switch 93, Figs. 2 and 3, which may be a micro-switch, is provided with an actuating lever in the path of the tread to be depressed by the tread.

When the actuating lever is depressed the high speed circuit of the motor is opened preventing its operation at high speed.

When the first ply is to be applied to the drum the drum is brought to a period of rest, the supply roll 28 and its table 33 are shifted to an initial position so that the center line of the ply is slightly offset from the center or mid plane of the drum. Ply stock is now drawn from the upper roll 28 and guided onto the drum by hand and the lead-in corner of the bias cut ply is "tacked" to one of the shoulders of the drum which has been coated with cement. Thereupon the drum is rotated by means of its motor at low speed for one complete revolution, whereupon it is stopped. The ply stock is then torn off and laid back onto the table 33 and the ends of the first ply are then spliced on the drum.

To apply the second ply the drum is rotated at low speed in reverse. Preferably it is rotated a part of a turn as, for example, a quarter revolution, and stopped. The supply roll 28 and table 33 are then shifted until the center line of the ply is displaced on the opposite side of the median plane of the drum. Thereupon the motor rotates in reverse drawing the ply under the guide roller 53, Fig. 4, until a complete ply has been drawn onto the drum. These plies may then be stitched by stitching disks in the ordinary way. The ends of the plies projecting beyond the ends of the drum are turned down onto the face of the drum by any suitable means or by hand. Beads are then applied.

Thereupon the supply table is shifted back to its initial position. The upper supply table 33 is then tilted upwardly and the ply stock is drawn from the lower supply roll 42 over the lower table or pan 48 and tacked to the surface of the second ply. The drum is then rotated at low speed for a complete revolution drawing a ply onto the drum. The lower supply roll and pan are then shifted in an opposite direction, the fabric drawn under the guide roll 53 and the drum rotated in reverse for a complete revolution drawing the fourth ply onto the drum. After each ply is drawn the stock is severed and returned to the pan or table 48. The drum is then in position for the application of the breaker and chafer supplying strips.

To apply the breaker and chafer strips the table 69 is pulled forward and the front ends of the strips are attached to the plies on the drum and the drum given one revolution, thereby drawing a length of the strips between their respective guides onto the drum. Thereupon the strips are severed and the table 69 moved back to its original position.

To apply the tread strips pressure fluid is applied through the control valve 92 to the cylinder 81 moving the platform 77 forward to a position where the front end of the tread may be attached to the plies on the drum and the tread drawn onto the drum.

While plies are drawn from the rolls adjacent the drum the rolls on the opposite side of the turret may be replenished or replaced. When the stock is exhausted from the end of the turret over the tire building drum it is only necessary to revolve the turret 180° swinging the exhausted end to a position for replenishment and bringing the reloaded end into position to supply the drum. This rotation of the turret is accomplished by pressing a push button 95 in an electric circuit 96, Fig. 9, leading from a main 97 to a pair of branch circuits 98 and 99 which comprise parallel solenoids 100 and 101, Figs. 5 and 9, of the 4-way valve 60, which in turn admits air to cylinder 58 or 59, depending upon which way the turret is to be turned. The circuit 96 also comprises micro switches 102 and 103 respectively on the arms 27 of the turret, Fig. 1.

These switches 102 and 103 are arranged in series and are closed when the tables 48 are lifted so that they clear the tire building mechanism and tread supply when the turret is rotated. When the tables are in position where they would not clear the tire building mechanism and tread supply a corresponding switch will be opened and the turret cannot be rotated.

In the respective branch circuits 98 and 99 are included switches 104 and 105 in series with the solenoids 100 and 101 respectively, one of which will be opened when the other is closed.

The switches 104 and 105 may be mounted on the frame 64, Fig. 3, in position to be opened and closed by cams 106 and 107 on the rotatable pillar 17, these cams being arranged to open and close the switches alternatively. Accordingly the opening and closing of these switches determines the solenoid 100 or 101 to be energized when the push button 95 is closed. When the turret is to be turned, therefore, the tables 33 and 48 are moved out of position in such manner as to close the switches 102 and 103 and the push button switch 95 is closed, whereupon the current will flow through the branch circuit 98 or 99 depending upon which of the circuits 104 or 105 is closed, and thence to a return main 108.

To maintain a circuit through the branches 98 and 99 upon the release of the push button switch and while the turret is turning a shunt circuit 109 around the push button 95 is closed through a switch 110, the switch 110 being closed by means of a solenoid 111. The circuits 98 and 99 will, therefore, remain closed until the switch 104 or 105 is opened by its cam. This insures that the turret will complete its revolution of 180° once the push button switch is closed.

The off-setting of the arms 21—25 of the turret so that the end to be loaded is at one side of the chafer strip, breaker strip and tread supply provides a clear space above the loading end of the chafer supply so that they may be supplied simultaneously without interference.

The liner roll-up rolls 30 may also be provided with a "free wheeling" arrangement whereby when the ply fabric is drawn from the roll 28 the roll 30 rotates freely to wrap up the liner fabric, but when rotating the roll 28 to wrap a supply of ply fabric thereon a clutch engages the roll with a brake device which puts the liner fabric under tension. Such a clutch may be of any suitable type as, for example, one having rollers or balls which clutch the clutch elements when rotated in one direction but release them when rotated in the opposite direction.

In the embodiments of this invention as shown in Figs. 7 and 8, the liner roll 30 is in the form of a hollow cylinder supported on its opposite ends on a stationary shaft 113 which is secured to one of the swinging supporting arms 31, shown in Fig. 8, in such a manner as to prevent rotation with the roll 30 but to permit a limited longitudinal movement.

The cylindrical shell of the roll 30 is supported on the shaft by means of ball bearings 114, the outer raceway of which is secured to the roll 30. At the end of the roll, shown in Fig. 8, the inner raceway of the bearing is mounted on a sleeve 115 carried within a bearing on the arm 31 and mounted on the shaft 113 by key, or otherwise, to permit it to move longitudinally but without rotational movement.

The sleeve 115 extends into the roll 30 and abuts at its inner end the outer hub 116 of a clutch. The opposite face of the clutch element 116 is closed by an end plate 117 forming a support for a thrust bearing 118 between the end plate 117 and a clutch member 119. This clutch member has an extension 120 within the outer clutch member 116 and at its opposite end has a flange 121 which has an asbestos or other friction face 122.

The flange 121 and friction surface are in contact with a partition plate 123 rigidly or integrally secured to the cylindrical shell 30. The flange 121 and friction surface 122 are pressed against the partition plate 123 by means of a spring 124 confined between the end of the sleeve 115 and lock nuts 125 on a threaded end of the shaft 113. By adjusting the lock nuts the pressure of the friction surface on the partition 123 may be adjusted.

When the two clutch elements 116 and 119 are unclutched the friction face 122 rotates freely with partition 123 and shell 30. This is the case when the liner strip is being wound on the roll inasmuch as a free rolling with little resistance is desired when the bias cut fabric is being drawn from the supply roll.

When the liner is drawn from the liner roll, however, in order to be wrapped onto a supply roll being filled, it is desired to draw the liner roll with a controlled tautness. For this purpose the two clutch elements are clutched or engaged by means of rollers 126, Fig. 7, contained in approximately tangential recesses 127 in the outer clutch 116 in such manner as to wedge the rollers 126 when the clutch element 116 is rotated in one direction relative to the clutch element 120 and to release the clutch elements when they are rotated in opposite directions. The rollers 126 are urged toward engaging or clutching position by means of spring pressed plungers 128.

What I claim is:

1. Apparatus for supplying tire elements to a forming drum which comprises means for supplying tire fabric to said drum, said means comprising a supply roll to hold a supply of tire fabric and liner fabric, a liner roll to receive liner fabric from said supply roll, a friction surface having a pressure contact with said liner roll to rotate therewith and a clutch to hold said friction surface stationary when said liner rotates in a direction to draw liner fabric therefrom and to release said friction surface when rotating in the opposite direction.

2. Apparatus for supplying tire elements to a forming drum which comprises means for supplying tire fabric to said drum, said means comprising a supply roll to hold a supply of tire fabric and liner fabric, a liner roll to receive liner fabric from said supply roll, a friction surface having a pressure contact with said liner roll to rotate therewith, a clutch to hold said friction surface stationary when said liner rotates in a direction to draw liner fabric therefrom and to release said friction surface when rotating in the opposite direction, said clutch comprising a clutch plate having recesses substantially tangential to and intersecting its periphery and spring pressed rollers in said recesses.

3. Apparatus for supplying tire elements to a rotatable tire forming drum which comprises a supply turret having a pair of arms extending diametrically from a pivotal axis, fabric supply rolls on said arm to swing alternately to position to supply fabric to said drum and to position to be replenished, means to rotate said arms on said axis, an electric circuit having means to control said rotating means, a push button to close said circuit, a pair of branch circuits and switches in parallel and cams rotating with said supply turret to hold one of said branch switches open and the other closed during a half turn of said turret and alternately during the other half turn of said turret.

4. Apparatus for supplying tire elements to a rotating forming drum which comprises a rotatable turret, a pair of supply mechanisms having delivery arms tiltable downwardly to delivery position relative to said drum and upwardly out of contact with said drum, means for rotating said turret, an electric circuit having means to control the rotation of said circuit, switches on said supply mechanism in series in said circuit to open when said arms are lowered and to close when said arms are raised, a starting switch in series with said arm control switches, said circuit having a pair of branches and switches in said branches and means to open the switch of one branch and close the switch of the other when said turret is in one half of its rotation and to reverse the opening and closing of said switches when said turret is in the other half of its rotation.

5. Supply mechanism for supplying tire fabric to a forming drum which comprises a support comprising a pair of spaced parallel beams, a pair of plates one adjacent each of said beams, a supply roll and a feed table mounted on and between said plates, a fluid pressure cylinder mounted on one of said beams and a piston movable in said cylinder and connected to one of said plates whereby said plates and said supply roll and feed table mounted on said plates may be shifted a limited distance relative to said beams and in a direction axially of said roll.

6. A supply mechanism for tire building apparatus which comprises a rotatable turret, tire fabric supply means on opposite sides of the axis of rotation of said turret, each tire supply means comprising a fabric supply roll and a guiding plate for fabric pivoted to said turret to tilt to an upper and a lower position, power driven means to rotate said turret to bring one fabric supply mechanism into position to feed tire fabric and the other of said tire fabric supply means to position to receive a supply of tire fabric, a power supply to said rotating means and means on each of said guides to interrupt said power supply when said guide plate is in a lower position.

CUYLER S. McCHESNEY.

REFERENCES CITED

The following references are of record in the file of this patent:

UNITED STATES PATENTS

| Number | Name | Date |
|---|---|---|
| 2,313,035 | Breth | Mar. 9, 1943 |
| 1,915,061 | Leguillon | June 20, 1933 |
| 1,966,087 | Bostwick | July 10, 1934 |
| 2,039,532 | Heston | May 5, 1936 |
| 2,242,810 | Bostwick | May 20, 1941 |
| 2,340,267 | Haase | Jan. 25, 1944 |
| 2,343,954 | Carlin | Mar. 14, 1944 |
| 2,346,439 | Leguillon | Apr. 11, 1944 |
| 2,045,534 | Stevens | June 23, 1936 |
| 2,045,554 | Heid | June 23, 1936 |
| 1,255,320 | G. F. Knight et al. | Feb. 5, 1918 |
| 2,365,341 | U. C. Haren et al. | Dec. 19, 1944 |